US005895603A

United States Patent [19]

McCready

[11] Patent Number: 5,895,603
[45] Date of Patent: Apr. 20, 1999

[54] ENGINE OIL ADDITIVE

[76] Inventor: David F. McCready, R.D. 4, Box 185, Altoona, Pa. 16601

[21] Appl. No.: 07/947,569

[22] Filed: Sep. 21, 1992

[51] Int. Cl.$^6$ .......................... C10M 103/06; B22F 1/02
[52] U.S. Cl. ................................ 75/253; 75/252
[58] Field of Search ................. 75/252, 253; 252/25, 252/26, 30, 58

[56] References Cited

U.S. PATENT DOCUMENTS

| | | | |
|---|---|---|---|
| 3,202,626 | 8/1965 | FitzSimmons | 252/25 |
| 3,380,843 | 4/1968 | Davis | 252/12 |
| 3,691,074 | 9/1972 | Messina | 252/25 |
| 3,788,987 | 1/1974 | Bartlett | 252/25 |
| 3,879,301 | 4/1975 | Cairns | 252/12 |
| 3,896,036 | 7/1975 | Cairns | 252/12 |
| 3,994,814 | 11/1976 | Cairns | 252/12 |
| 4,414,241 | 11/1983 | Quella et al. | 427/2 |
| 4,584,116 | 4/1986 | Hermant et al. | 252/51 |
| 4,615,817 | 10/1986 | McCoy | 252/16 |
| 4,626,365 | 12/1986 | Mori | 252/12 |
| 4,655,944 | 4/1987 | Mori | 252/12.2 |
| 4,655,945 | 4/1987 | Balsells | 252/124 |
| 4,888,122 | 12/1989 | McCready | 252/25 |

Primary Examiner—Keith D. MacMillan
Attorney, Agent, or Firm—James Creighton Wray; Meera P. Narasimhan

[57] ABSTRACT

An oil additive for repairing abrasions and lubricating engine bearing surfaces is provided. A mixture of granular granulated alloy material and granular polytetrafluoroethylene (PTFE) are added to the engine or engine oil, with normal engine operations peening and burnishing the granulated metal alloy material granules to the surfaces to thereby form a matrix which entraps the PTFE granules. Continued operation of the engine gradually wears away particles of the matrix to uncover the embedded PTFE granules for slow release of granules. In one embodiment, about 1% to 2% by composition of the mixture is granules of titanium dioxide for preparing the bearing surfaces and enhancing additive performance. The granules of the mixture are micron to submicron in size and can adhere readily to surface abrasions and smooth surfaces.

4 Claims, No Drawings

ENGINE OIL ADDITIVE

BACKGROUND OF THE INVENTION

The present invention relates to dry powder lubricants for addition to oil supplies in engines.

Applicant's previously granted patent U.S. Pat. No. 4,888,122, Engine Oil Additive Dry Lubricant Powder, provide an additive which forms a sub-micron layer coating on the bearing surfaces in an engine. A mixture of two types of polytetrafluoroethylene (PTFE) and about 1–2% $T_1O_2$ are added to the engine oil. The titanium dioxide burnishes the surfaces and enhances the adhesion of the PTFE. Although this method of lubricating engines is effective, a need exists for a lubrication powder which is especially suited for older, more worn engines, such as those having 50,000 or more accrued road miles. The coating is abraded away and needs to be constantly replaced. That is not a problem in the use of the material which accomplishes its purpose. However, it would be more desirable to have a surface which was more slowly abraded.

A current technology for engine additives provides granulated alloy material which are added to the engine oil and are subsequently peened into surface abrasions and burnished to fill in cracks and scratches and to build surfaces towards original clearances. Although this effectively repairs damaged bearing surfaces, it does not form a lubricating coating as found in the applicants previous invention.

SUMMARY OF THE INVENTION

The present invention provides a mixture of granulated alloy material and polytetrafluoroethelyne which creates a synergistic benefit of repairing engine abrasions, while coating the bearing surfaces for slow release, and physically trapping lubricant particles, exposure and smaring of the low coefficient of friction material of PTFE across the newly built up metallic alloy surfaces.

An engine oil additive in the form of a dry lubricant powder is a mixture of a granulated alloy material and polytetraflouroethelyne granules. The granules are preferably micron or sub-micron in size. A preferred size is 0.5 microns. In a preferred alternative embodiment, titanium oxide or titanium dioxide granules of approximately .5 microns in size can be added to the mixture. The inclusion of titanium dioxide prepares the bearing surfaces for accepting the granulated alloy material and PTFE mixture. The granulated alloy material is peened and burnished to the bearing surfaces, thereby entwining and embedding the granules of PTFE within a matrix formed thereby. This simultaneously fills surface irregularities and lubricates the bearing surface. The PTFE granules are dispersed throughout the peened and burnished coating for smearing the PTFE along the surface of the coating and allowing for continued lubrication throughout the normal wear of the engine. The titanium dioxide burnishes and de-glasses the bearing surfaces and causes the mixture to stick and coat to the bearing surfaces.

A preferred granulated alloy material is an alloy of silver, copper and lead, formed in granules which fill surface irregularities and are peened and burnished to the surfaces.

The PTFE particles can be of a particular type having a singular recommended temperature range, or a mixture of types having varying temperature ranges.

The dry powder is added to the engine oil in a desired portion. It can be added to a quart of oil prior to placement into the oil filler opening, or can be added directly to the engine to be mixed during normal engine operation.

The present invention is ideal for older, more worn engines where surface irregularities have been created due to impurities in the oil. In such cases, the powder repairs the irregularities while supplementing the lubricating capabilities of oil.

The relatively small granular size of 0.5 microns is used by the present invention to make the powder rapidly adhere to the smallest surface irregularities in the friction surfaces which it encounters and is ideal for peening and burnishing within these surface irregularities.

While an understanding of the actual operation of the product is not necessary to understanding the results of the product, the titanium dioxide forms a glaze upon the high temperature metal surfaces which it encounters and that the mixture of the titanium, granulated alloy material and polytetrafluoroethylene granules rapidly coats and fuses the porous friction surfaces in the engine with the titanium dioxide subsequently forming a glaze upon the surface of the peened and burnished surface. As the coated surface wears, new granules of PTFE are exposed to replenish the lubricating aspect of the present invention.

These and further and other objects and features of the invention are apparent in the disclosure, which includes the above and ongoing written specification, with the claims and the drawings.

DETAILED DESCRIPTION OF THE INVENTION

The present invention is designed to provide synergistic benefits repairing and protecting engine bearing surfaces while simultaneously lubricating these surfaces.

In a preferred embodiment, a granulated alloy material of granulated silver, copper and lead alloy is mixed on a 4 to 1 ratio with granules of approximately the same size of polytetrafluoroethylene. A preferred granule size is 0.5 microns. This small micron size allows passage through oil filters, which typically filter all particles approximately greater than 30 to 40 microns. In a preferred embodiment, small particles or granules of titanium oxide or titanium dioxide of about the 0.5 micron size are mixed with the granulated alloy material and PTFE granules, preferably in a small percentage such as 1% to 2%. The synergistic effect of metal alloy particles trapping PTFE particles on the surface both protects and repairs older worn engines, while providing a prolonged release of lubricant for increased efficiency.

Other alloys for the granulated alloy material are not beyond the scope of the present invention.

When applied, the dry powder is carried by the engine oil to friction-bearing surfaces where, in the embodiment where titanium dioxide is included, the powder prepares the surfaces for adhesion of the mixture of granulated alloy material and polytetrafluoroethylene granules. Continued running of the engine peens and burnishes the granulated alloy material to the surface irregularities and to the bearing surfaces, embedding and entrapping PTFE granules within the matrix of the coating. The heat of the engine further fuses the granulated alloy material to the surfaces to provide an all-around coating.

Because the present powders are added to the engine oil when hot or during a brief interruption in operation to add the powders, the powders do not agglomerate in the crank case or in other areas where oil tends to collect, but rather move quickly to the high temperature friction surfaces where they deposit.

EXAMPLE 1

Amounts in the ratio of 4 to 1 granulated alloy material to PTFE granules are mixed with 1% to 2% titanium dioxide, all having granular particle sizes of micron to submicron, and preferably having a particle size of about 0.5 microns to provide the present invention.

An automobile having a four quart engine oil lubrication system which has been provided with a new conventional oil filter has one pint of new oil added to the engine. A second pint is used to blend with the powder at a ratio of approximately 2 ounces of powder to 4 to 5 quarts of oil. The blend of powder and oil are added to the engine, and are immediately followed by the remaining oil to fill the oil system to capacity. Its cap is replaced, the engine is restarted and the automobile is driven in normal traffic conditions for at least thirty minutes before the engine is shut off.

EXAMPLE 2

The same procedures in Example 1 are followed, except that the powder is added directly into the opening of the valve cover. Approximately 2 ounces of the powder-oil blend is added through a funnel into the crank case, whereupon the engine is immediately restarted and run for at least thirty minutes. The rapid agitation of the oil within the crank case, as well as the movement of the parts and bearing surfaces, serves to mix the powder with the oil and coat the powder onto the bearing surfaces.

EXAMPLE 3

The same procedures for Example 1 are followed, except that approximately 1 ounce of the dry powder-oil blend is placed in the valve cover opening, and approximately 1 ounce of the dry powder-oil blend is introduced through the dipstick directly into the crank case sump. Again, the engine is restarted and run for at least thirty minutes before it is shut off.

The present invention provides unusually fine dry lubricants, which are unencumbered by the suspension systems and which are rapidly carried to hot engine surfaces and plated thereon, repairing and protecting these surfaces while providing a time-release lubrication mechanism.

While the invention has been described with reference to specific embodiments, modifications and variations of the invention may be constructed without departing from the scope of the invention, which is defined in the following claims.

I claim:

1. The method of lubricating an engine and repairing surface abrasions on bearing surfaces comprising adding a supply of a mixture of a granulated metal alloy material and polytetrafluoroethylene (PTFE) granules having micron to sub-micron sizes to an oil supply within an engine, running the engine for a time sufficient to cause the granules of the granulated metal alloy material to be peened and burnished to bearing surfaces within the engine, thereby embedding PTFE granules within the matrix of granulated metal alloy material formed by the peening and burnishing.

2. The method of claim 1, further comprising providing a small percentage of titanium dioxide within the mixture for preparing the engine surfaces for accepting the mixture, and subsequently for providing a glaze on the outer surface of the peened and burnished mixture.

3. The method of claim 1, wherein the granules of PTFE and granulated metal alloy material are approximately the same size of about 0.5 microns.

4. The method of claim 1, wherein the mixture is a blend of approximately 4 parts to 1 granulated metal alloy material granules to PTFE granules.

* * * * *